Feb. 7, 1933.  C. L. PERRY  1,896,850
NOTCHING MECHANISM
Filed May 1, 1929
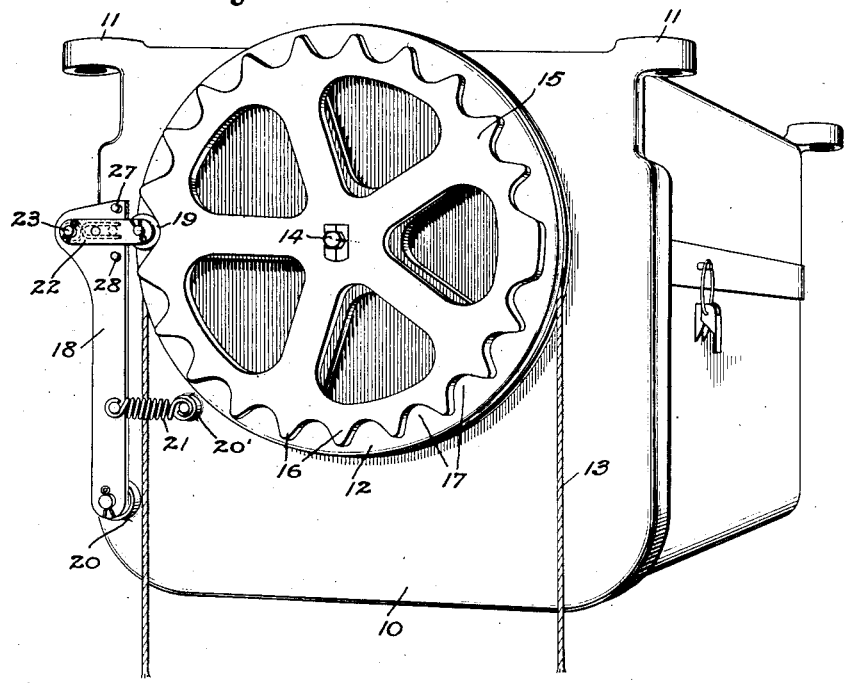
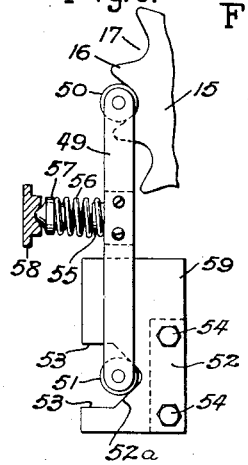
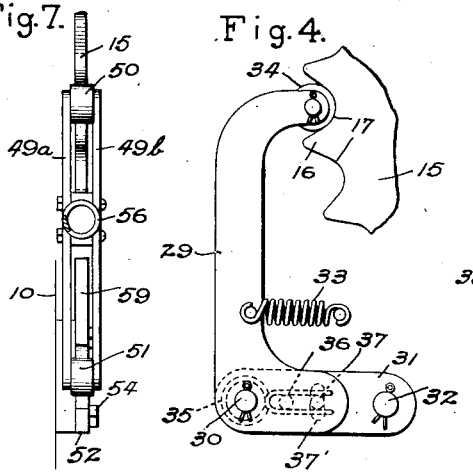
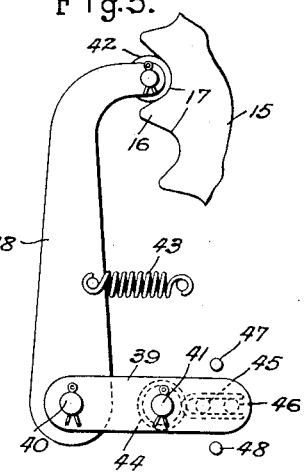
Inventor:
Charles L. Perry,
by Charles E. Mullar
His Attorney.

Patented Feb. 7, 1933

1,896,850

UNITED STATES PATENT OFFICE

CHARLES L. PERRY, OF SCHENECTADY, NEW YORK, ASSIGNOR TO GENERAL ELECTRIC COMPANY, A CORPORATION OF NEW YORK

NOTCHING MECHANISM

Application filed May 1, 1929. Serial No. 359,705.

My invention relates to notching mechanisms for controllers or the like wherein a rotatable element is adapted to be stopped in any one of a series of definite positions. The principal object of my invention is to provide an improved notching mechanism which will prevent the rotatable element from stopping in an intermediate or "dead center" position.

Ordinarily the rotatable shafts of controllers have been provided with star-wheels, arranged to cooperate with a movable latch or pawl for insuring the stopping of the controller in its definite positions. With the common type of star wheel notching mechanism, however, the pawl or latch is on dead center at the extremity or point of each tooth of the star-wheel and thus the controller may readily be held in an intermediate position instead of the definite position desired.

In order to overcome these objections I have provided an improved form of notching mechanism which has no dead center positions and thereby effectively insures operation of the controller to the desired definite positions.

My invention will be better understood from the following description taken in connection with the accompanying drawing and its scope will be pointed out in the appended claims.

Referring to the drawing, Figure 1 is a perspective view of a controller provided with one form of my improved notching mechanism; Figure 2 is a detailed view showing the relative positions of the parts during operation of the notching mechanism; Figure 3 is a view in section of the notching pawl taken on the line 3—3 of Figure 2 looking in the direction of the arrows; Figures 4, 5 and 6 are front elevations showing the invention embodied in modified forms; and Figure 7 is a side elevation partly in section looking toward the right in Figure 6.

In Figure 1 of the drawing I have illustrated a controller 10, adapted to be supported by means of suitable lugs or ears 11, and operated by means of the rope wheel or pulley 12 secured to the controller shaft and having the operating rope 13. A star wheel 15 having a plurality of teeth 16 formed on the periphery thereof is secured to the rope wheel 12 by means of a nut 14. It is to be understood that the notches 17 between the teeth 16 correspond in number and position to the definite positions of the controller switch mechanism, which may be of any suitable type and hence is not shown in detail. For reversible service the notches between the teeth preferably are made of symmetrical shape as shown.

In order to hold the star wheel 15, and consequently the controller shaft, in a selected position, the pawl 18 having an antifriction roller 19 engaging with the notches in the star wheel 15 is provided.

In the embodiment of my invention shown in Figures 1, 2 and 3, the pawl 18 of the latch mechanism is pivotally mounted on a lug 20 projecting from the face of the controller 10. A tension spring 21 is secured to a projection 20' on the housing 10 and the pawl 18 and serves to bias the pawl 18 and roller 19 toward the wheel 15. It will be seen that as the wheel 15 is rotated in either direction the roller 19, and consequently the pawl 18, will be forced outwardly, and if the rotation of the wheel is continued the pawl 18 will oscillate back and forth radially with respect to the star wheel, and when the rotation of the wheel 15 is stopped the biasing spring 21 will press the roller 19 into one of the notches 17, and thereby maintain the controller in a corresponding definite position.

In order to prevent the wheel 15 from stopping at an intermediate, or "dead center", position with the roller 19 resting on the extremity or tip of one of the teeth 16, an oscillatable mounting for the roller 19 is provided. This mounting comprises an arm 22 pivotally supported on a lug 23 secured to the pawl 18 and carrying at its outer end the anti-friction roller 19. As will be observed more clearly with reference to Figure 3, a pin 24 is secured to the supporting arm 22 and a pin 25 is secured to the upper or outer side of the pawl 18. A centering spring 26 surrounds the lug 23 and the extremities of this spring normally rest against the sides of the pins 24 and 25 so as to hold the arm 22 in alignment therewith. A pair of stop pins 27 and 28 are secured to the upper side of the pawl 18, these pins serving to limit the angular movement of the supporting arm 22 from its aligned position.

With reference to Figure 2, it will be observed that if the supporting arm 22 is moved toward one of the stops 27 or 28 the spring 26 will tend to return the arm to its center or normal position. Thus when the wheel 15 is rotated the roller 19 will initially move in unison with the star wheel 17 and the supporting arm 22 will be moved angularly from its aligned central position until it strikes one or the other of the stops 27 or 28, depending on the direction in which the wheel 15 is being rotated. As soon as the supporting arm 22 strikes one of the pins 27 or 28 the roller 19 then will start to ride up the sloping side of one of the teeth 16 and the pawl 18 will be moved outwardly away from the wheel 15. When the roller 19 reaches the extreme tip of the tooth 16 the spring 26 will bias the roller for movement in a direction substantially opposite to the direction of movement of the tooth and thereby cause the supporting arm 22 to snap immediately to its normal or center position and the spring 21 will retract the pawl 18 causing the roller 19 to rest in the next adjacent notch. Hence it will be seen that there is no possibility of the roller 19 remaining on the tip of the tooth 16 and the danger of the wheel 15 stopping in an intermediate, or "dead center", position is thus eliminated.

In the embodiment shown in Figure 4 a pawl 29 is pivoted by means of the pin 30 to a shorter arm 31 which is in turn pivotally supported on a lug 32 attached to the controller 10. A tension spring 33 corresponding to the spring 21 shown in Figure 1 serves to bias the pawl 29 toward the wheel 15. An anti-friction roller 34 is pivotally mounted directly on the end of the pawl 29. In this embodiment the centering spring 35 surrounds the pin 30 and the extremities of this spring engage pins 36 and 37, the pin 36 being secured to arm 31 while the pin 37 is secured to the arm 31 extends into the slot 37' formed in arm 31. While the detailed construction of this embodiment is somewhat different from that of the embodiment shown in Figure 1 the resulting action is substantially the same. When the wheel 15 is rotated, the roller 34 will initially move in unison with the star wheel 17, the pawl 29 moving on the pivot 30 relatively to the arm 31, but will ride up the side of the tooth 16 when pin 37 reaches either end of the slot 37'. When the roller 34 reaches the tip of the tooth 16 the spring 35 will bias the roller for movement in a direction substantially opposite to the direction of movement of the tooth, thereby tending to bring the lug 30 and the pins 36 and 37 again into alignment and the parts will thus be snapped to their normal position with the roller 34 resting in the next adjacent notch.

In the modification shown in Figure 5 a pawl 38 is pivoted to an arm 39 by means of a pin 40, the arm 39 being pivoted in turn on a pivot 41 secured to the controller 10. A roller 42 is mounted at the end of the pawl 38 and a tension spring 43 serves to hold this roller against the periphery of the star wheel 15. In this modification a centering spring 44 surrounds the pivot 41, the extremities of this spring resting against pins 45 and 46, the pin 45 being secured to the arm 39 and the pin 46 projecting from the controller 10. A pair of stop pins 47 and 48 also project from the controller 10 into the path of the arm 39. When the wheel 15 is rotated the roller 42 moves in unison with the star wheel until the side of the arm 39 engages one of the stops 47 or 48, whereupon the roller 42 will ride up the tooth 16 until it reaches the tip of the tooth. At this point the spring 44 will snap the pivot 41 and the pins 45 and 46 into alignment with the parts in their original position with the roller 42 resting in the next adjacent notch.

In the embodiment illustrated in Figures 6 and 7 a floating pawl member 49 is provided with rollers 50 and 51 mounted at its ends. A supporting member 52 having a V-shaped cut 52a and end surfaces 53 is secured to the housing 10 by means of suitable bolts 54. A lug 55 is secured to the side of the pawl 49 at a point slightly above the center of the pawl. A compression spring 56 engages the lug 55 and a corresponding lug 57 which is pivoted in a fixed supporting member 58. In this embodiment the pawl 49 is formed of a pair of elongated members 49a and 49b, the lower portions of these elongated members straddling an extension 59 of the support 52 and thereby being maintained in alignment therewith.

With the parts in position as shown in Figure 6 the spring 56 tends to bias the pawl 49 to the right with the roller 50 in a notch on the star wheel 15 and the roller 51 in the bottom of the V-shaped groove 52a of the support 52. When the star wheel 15 is rotated the roller 50 moves in unison with the star wheel, while the roller 51 slides along one of the sloping surfaces of the V-shaped groove 52a. When the roller 51 reaches the end of this slope and engages one of the end surfaces 53, further longitudinal movement of the pawl 49 will be arrested and the roller 50 will then ride up the sloping surface of one of the teeth 16. When the roller 50 has reached the tip of a tooth 16 the spring 56 will bias the roller for movement in a direction substantially opposite the direction of movement of tooth 16 and thus immediately snap the pawl 49 to its original position with the roller 51 again in the trough of the V-shaped groove 52a and the roller 50 in an adjacent indentation 17. Since the spring 56 engages the pawl 49 at a point at the upper side of the center of the pawl the pressure of the roller 51 against the supporting member 52 will be less than the pressure of the roller 50 against the wheel 15 and thus the roller 51 will start to move outwardly along the groove 52a before the roller 50 will move on the surface of a tooth 16. By pivoting the end of the spring 56 against the fixed support 58 the movement of the pawl 49 will not be influenced by the stiffness of the spring 56.

It will be noted that in each of the embodiments of the invention a notching mechanism is provided by means of which the star wheel 15 and the rotatable element to which the wheel is secured will be held in any one of a plurality of positions while the possibility of the wheel 15 stopping in a "dead center" position is positively eliminated.

While I have described my invention as embodied in concrete form and as operating in a specific manner in accordance with the provisions of the patent statutes, it should be understood that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States, is:

1. In a notching mechanism, the combination of a relatively movable pawl and a notched member, a movable member carrying said pawl and means for biasing said movable member to cause said pawl to engage said notched member, and a biasing means carried by said movable member and operably connected with said pawl whereby upon movement of said notched member said pawl member will move therewith in either direction for a limited distance and be returned to initial position.

2. In a notching mechanism, the combination of a movable toothed member, a second movable member carrying a pawl movably mounted thereon, a resilient member for biasing said movable member toward said toothed member whereby said pawl engages said toothed member, and biasing means carried by said movable member and operably connected with said pawl for biasing the pawl for movement in a direction transverse a tooth upon movement of the toothed member and to initial position after said movement.

3. In a notching mechanism, the combination of a notched member and a cooperating pawl member, a movable member for supporting said pawl member, means for biasing said movable member toward said notched member to engage said pawl with said notched member, and means carried by said movable member and operably connected with said pawl for permitting movement of said pawl in unison with said notched member and for relative movement therebetween and for returning said pawl to initial position upon movement of the pawl and notched member.

4. In a reversible notching mechanism operable in any plane, the combination of a pawl member, a cooperating member having symmetrical notches therein, means for mounting said members for movement in unison in opposite directions and for relative movement therebetween, and biasing means having cooperating centering stops for centering said pawl member and effective upon the initial movement of the pawl member in unison with the notched member in either direction for biasing the pawl to its initial position.

5. In a notching mechanism, the combination of a movable member having a series of notches therein and operable in any plane, a pawl member mounted for movement into and out of said notches and also for movement with said notches in either direction and transverse to the notches, biasing means for resisting movement of the pawl transverse to the notches and for returning said pawl to initial position after said movement, and biasing means for biasing the pawl into said notches.

6. In combination with a device adapted to be operated to a plurality of definite positions and operable in any plane, notching mechanism therefor comprising a toothed member secured to said device, a pawl member adapted to engage the toothed member, means for biasing said pawl member to a position between adjacent teeth of said toothed member when said device is in each of its definite positions, and means for supporting said pawl member for movement both in unison with said member in opposite directions and relative to said toothed member when said device is operated between its definite positions, and biasing means for returning said pawl to its initial position after movement in unison with said member.

7. Notching mechanism comprising a rotatable star-wheel, a movable member biased toward said star-wheel, a pawl member mounted on said movable member for both peripheral and radial movement with respect to the axis of said star-wheel, and means on said movable member for biasing said pawl member to a predetermined position in the path of said star-wheel, and having centering stops cooperating with said biasing means for centering said pawl member.

8. In combination with a controller, notching mechanism therefor comprising a rotatable star-wheel, a pawl member, a fixed support having a beveled surface, and means for biasing one end of said pawl towards the periphery of said star-wheel and the other end of said pawl towards the beveled surface of said fixed support.

9. In combination with a controller, notching mechanism therefor comprising a star-wheel secured to said controller to rotate therewith, a pawl mounted for limited radial and peripheral movement of one end thereof with respect to the axis of said star-wheel, means for biasing said one end of said pawl radially against said star-wheel, and means cooperating with said pawl and biasing means for yieldingly resisting movement of said one end of the pawl peripherally with said star-wheel.

10. In combination with a controller having a rotatable element, notching mechanism for said element comprising a wheel having a serrated edge, said wheel being secured to said element to rotate therewith, a pawl, supporting means for said pawl, an anti-friction member secured to one end of said pawl, means for biasing said pawl so that said anti-friction member engages the serrated edge of said wheel, means for supporting said pawl so that said anti-friction member will be moved peripherially with said wheel for a predetermined distance when said wheel is rotated, and means cooperating with said biasing means for returning said anti-friction member to its original position after it has been moved through said predetermined distance.

11. In combination with a rotatable member, notching mechanism therefor comprising a wheel secured to said member, said wheel having a serrated edge, an anti-friction member, means for biasing said anti-friction member to a normal position in engagement with said serrated edge, means for supporting said anti-friction member so that said member may be moved peripherially with said wheel for a predetermined distance when said wheel is rotated, and means for returning said member to said normal position on continued rotation of said wheel.

12. In combination with device having a plurality of positions, a wheel secured to said device, the edge of said wheel having a plurality of indentations formed thereon, corresponding to said positions, a fixed support having a sloping surface, a latch member adapted to cooperate with said indentations to hold said wheel in a selected position, said latch member comprising a pawl, a roller mounted at each end of said pawl and a single resilient means for biasing one of said rollers against the sloping surface of said fixed support and the other of said rollers against the edge of said wheel, whereby said last mentioned roller will engage one of said indentations to hold said wheel in each of its positions.

13. In combination with a mechanism having a movable element, a notching device for said element including a notched member, said movable element and notched member being movable together between a plurality of definite operating positions, and means cooperating with said notched member including a pawl movable therewith for a limited distance, and biasing means having cooperating stops for centering said pawl, said biasing means being rendered effective upon the initial movement of the pawl for yieldingly opposing the movement of said notched member and movable element from one of said definite positions to another.

14. In combination with a mechanism having a movable element, a notching device for said element including a notched member movable therewith, said element and notched member being movable together between a plurality of definite operating positions, a pawl biased to engage said notched member to hold the same in any one of said definite positions and movable therewith for a limited distance, and biasing means having cooperating centering stops for centering said pawl and cooperating with said pawl and rendered effective upon the initial movement of the notched member for yieldingly opposing movement of said pawl and said notched member when said notched member and movable element are moved from one of said definite positions to another.

15. In combination with a controller having a movable element, a notching mechanism for said element including a notched member movable therewith, said movable element and notched member being movable in opposite directions between a plurality of definite operating positions, a pawl, a movable member carrying said pawl and biased to engage said pawl with said notched member to retain said notched member in any one of said definite positions, said pawl being movable with said notched member for a limited distance in other directions, and biasing means having cooperating centering stops for centering said pawl and cooperating with said pawl and rendered effective upon the initial movement of the notched member in either of said opposite directions for yieldingly opposing movement of said pawl and said notched member when said notched member and movable element are moved from one of said definite positions to another.

In witness whereof, I have hereunto set my hand this 30th day of April 1929.

CHARLES L. PERRY.